UNITED STATES PATENT OFFICE.

EDWARD D. GLEASON, OF NEW YORK, N. Y., ASSIGNOR, BY MESNE ASSIGNMENTS, TO NEW-METALS AND PROCESS COMPANY, OF LONG ISLAND CITY, NEW YORK, A CORPORATION OF NEW YORK.

MOLDING COMPOUND.

1,077,958. Specification of Letters Patent. Patented Nov. 4, 1913.

No Drawing. Application filed December 31, 1912. Serial No. 739,453.

*To all whom it may concern:*

Be it known that I, EDWARD D. GLEASON, of Brooklyn, in the county of Kings, city and State of New York, have invented a certain new and useful Improvement in Molding Compounds, whereof the following is a specification.

My invention relates to a composition and a process for forming the same into a mold for casting metals having melting points from 1500 degrees F. upward.

My composition consists of eleven volumes of inert pulverulent material such as talc, preferably the variety of steatite known as soapstone, or graphite, or coal ash, and one volume of finely powdered Portland cement, to which, when thoroughly mixed in the dry state, I add, while agitating said mixture by stirring or otherwise, an aqueous solution containing two volumes water and one volume saturated solution of sodium silicate. The volume of said liquid added to the powdered mixture varies in accordance with the desired consistency of the composition, for instance, if it is desired to form a mold by pressing the composition, the latter may be made of the consistency of putty, or, if it is desired to pour the composition to form a mold, it may be made of the consistency of thick molasses; such variations in viscosity of the composition being according to the amount of said liquid contained therein.

My improved composition aforesaid is similar to plaster of Paris in that it sets and hardens without heat. When set said composition has the texture of hard soap or wax. It may be observed that the capacity of the composition to thus set is apparently due to the cement ingredient thereof, and that the coherence and toughness of the composition when set is apparently due to the silicate ingredient thereof. Said composition may be used to form molds in ordinary flasks either by pouring the liquid composition over patterns set in the flask or by placing the composition in the flask and subsequently pressing the patterns into it.

In the former case, I set an extra deep flask upon a following plate, set in the flask a match plate of metal patterns, and then pour in the flask and over the pattern my improved composition of the consistency of thick molasses, until the flask is two-thirds full. The composition is then allowed to set for forty-eight hours in an atmosphere at a temperature of approximately 125 degrees F. and, by the expiration of that time, the composition will assume the nature of hard soap or wax; the match plate of patterns is then rapped and lifted and immediately replaced in the mold. The flask is then put under a hydraulic press having a plunger fitting into the unfilled part of the flask, whereby pressure is gradually applied until the surplus liquid is ejected from the composition. Thereupon, the patterns are again rapped, lifted and replaced and the mold subjected to a heat of from 300 to 500 degrees F. The mold is then ready for use, and has the capacity for resisting the action of heat and water and consequently is extremely durable. In the other case, the flask may be first filled with my composition, and when it is set hydraulic pressure be applied to eject the surplus moisture, and the patterns be then pressed into the composition by means of a squeezing machine of ordinary construction now employed in molding sand.

It is to be understood that I do not desire to limit myself to the precise proportions, or to the specific details of procedure herein set forth, as it is obvious that various modifications may be made therein without departing from my invention as defined in the appended claims.

I claim:—

1. A composition capable of resisting the action of heat at 1500 degrees F., and adapted for use in a molding process containing inert pulverulent material, hydraulic cement and sodium silicate.

2. A composition capable of resisting the action of heat at 1500 degrees F., and adapted for use in a molding process containing powdered soapstone, hydraulic cement and sodium silicate.

3. The process of forming the composition described, which consists in mixing dry inert pulverulent material with dry powdered hydraulic cement, and then adding to said mixture, while agitating it, an aqueous solution of sodium silicate.

4. The process of forming the composition described, which consists in mixing eleven volumes of dry inert pulverulent material with one volume of dry powdered hydraulic cement, and then adding to said mixture, while agitating it, an aqueous solution containing two volumes of water and one volume of saturated solution of sodium silicate.

In testimony whereof, I have hereunto signed my name at Philadelphia, Pennsylvania, this thirtieth day of December, 1912.

EDWARD D. GLEASON.

Witnesses:
ANNA ISRAFLVITZ,
ETHEL M. IMSCHWEILER.

Copies of this patent may be obtained for five cents each, by addressing the "Commissioner of Patents, Washington, D. C."